(12) United States Patent
Tao et al.

(10) Patent No.: US 10,989,829 B2
(45) Date of Patent: Apr. 27, 2021

(54) METHOD FOR OPERATING A MULTI-FREQUENCY METAL DETECTOR AND MULTI-FREQUENCY METAL DETECTOR

(71) Applicant: Mettler-Toledo Safeline Ltd., Manchester (GB)

(72) Inventors: Yang Tao, Manchester (GB); Christos Ktistis, Warrington (GB)

(73) Assignee: Mettler-Toledo Safeline Ltd., Manchester (GB)

( * ) Notice: Subject to any disclaimer, the term of this patent is extended or adjusted under 35 U.S.C. 154(b) by 119 days.

(21) Appl. No.: 16/264,277

(22) Filed: Jan. 31, 2019

(65) Prior Publication Data

US 2019/0235118 A1 Aug. 1, 2019

(30) Foreign Application Priority Data

Feb. 1, 2018 (EP) ..................................... 18154719

(51) Int. Cl.
*G01V 3/10* (2006.01)
*H01F 7/06* (2006.01)

(52) U.S. Cl.
CPC ................ *G01V 3/10* (2013.01); *G01V 3/107* (2013.01); *H01F 7/064* (2013.01)

(58) Field of Classification Search
CPC ... G01V 3/08; G01V 3/10; G01V 3/30; G01V 3/104; G01V 3/105; G01V 3/107; H01F 7/064; G08B 21/22
See application file for complete search history.

(56) References Cited

U.S. PATENT DOCUMENTS 6,724,191 B1 4/2004 Larsen
6,967,574 B1 11/2005 Nelson
(Continued)

FOREIGN PATENT DOCUMENTS

EP 2570824 A1 3/2013

OTHER PUBLICATIONS

Das, S. et al. Implementation of IGBT Series Resonant Inverters Using Pulse Density Modulation, International Journal of Industrial Electronics and Electrical Engineering, Feb. 2015, pp. 61-66, vol. 3, Issue 2.

(Continued)

*Primary Examiner* — Minh N Tang
(74) *Attorney, Agent, or Firm* — Standley Law Group LLP; Jeffrey S. Standley; Stephen L. Grant (57) ABSTRACT

A metal detector (1) has a drive coil (L61) and at least one detection coil (L62, L63) that detect fluctuations in a magnetic field generated by the drive coil, caused by metallic particles present in an inspected object. A multi-frequency transmitter unit (10) has a converter (4) with a plurality of drive switches (S41, S42; S43, S44) driven by a drive controller (2). The drive switches alternately conduct a drive current through the drive coil to generate an electromagnetic field with two or more different frequency components. A waveform of the drive current is determined, as is at least one pulse-modulated (PXM) signal corresponding to the determined waveform. The determined PXM-signal is determined online or is stored in a memory module (231; 232). The determined PXM-signal is generated and applied to control the drive switches. The drive current can be applied to the drive coil through an admittance unit (5).

16 Claims, 6 Drawing Sheets

(56) References Cited

U.S. PATENT DOCUMENTS

| | | |
|---|---|---|
| 7,652,477 B2 | 1/2010 | Candy |
| 8,159,225 B2 | 4/2012 | Stamatescu et al. |
| 8,473,235 B2 | 6/2013 | Kittel et al. |
| 8,587,301 B2 | 11/2013 | Derungs |
| 9,018,935 B2 * | 4/2015 | McAdam ............... G01V 3/104 |
| | | 324/67 |
| 9,348,053 B2 | 5/2016 | Candy |
| 10,215,875 B2 * | 2/2019 | Moore ................... G01V 13/00 |

OTHER PUBLICATIONS

Grimble, M. J. et al., Advances in industrial Control, Chapter 2 Pulse-Width Modulation, 2012, 40 pages, Springer-Verlag London Limited.

* cited by examiner

METHOD FOR OPERATING A MULTI-FREQUENCY METAL DETECTOR AND MULTI-FREQUENCY METAL DETECTOR

CROSS-REFERENCE TO RELATED APPLICATIONS

This application claims priority to European Patent Application 18154719.1, filed on 1 Feb. 2018, which is incorporated by reference as if fully recited herein.

TECHNICAL FIELD

The invention relates to a method for operating a multi-frequency metal detector and to a multi-frequency metal detector operating according to this method.

BACKGROUND ART

As described in US published application 2012/0206138 A1, metal detectors are used to detect and reject unwanted metal contamination. When properly installed and operated, a metal detector will help reduce metal contamination and improving food safety. Most modern metal detectors utilise a search head comprising a coil system with a drive coil receiving a drive signal and generating an electromagnetic field in the product, and at least one detection coil arranged to detect fluctuations in the magnetic field caused by the presence of metallic particles in the product including ferrous, nonferrous and stainless steels in a large variety of products such as fresh and frozen food products.

A metal detection system that operates according to the "balanced coil"-principle typically comprises three coils, a drive coil and two identical detection coils that are wound onto a non-metallic frame, each exactly parallel with the other. Since the detection coils, which typically enclose the drive coil centred in between, are identical, an identical voltage is induced in each of them. In order to receive an output signal that is zero when the system is in balance, the first receiver coil is connected in series with the second receiver coil having an inversed sense of winding. Hence the voltages induced in the receiver coils, that are of identical amplitude and inverse polarity are cancelling out one another in the event that the system is in balance and no contamination is present in an observed product.

However, as soon as a particle of metal passes through the coil arrangement, the electromagnetic field is disturbed first near one detection coil and then near the other detection coil. While the particle of metal is conveyed through the detection coils, the voltage induced in each detection coil is changed (by nano-volts). This change in balance results in a signal at the output of the detection coils that in a receiving unit can be processed, amplified and subsequently be used to detect the presence of the metal contamination in the observed product.

In typical metal detectors, signal processing channels provided in the receiver unit split the received signal into two separate components that are 90° apart from one another. The resultant vector has a magnitude and a phase angle, which is typical for the products and the contaminants that are conveyed through the coil system. In order to identify a metal contaminant, "product effects" need to be removed or reduced. If the phase of the product is known then the corresponding signal vector can be reduced. Eliminating unwanted signals from the signal spectrum thus leads to higher sensitivity for signals originating from metal contaminants.

Methods applied for eliminating unwanted signals from the signal spectrum therefore exploit the fact that metal contaminants, products and other disturbances have different influences on the magnetic field so that the resulting signals differ in phase. Signals caused by metals or products, as they pass through the coil system, can be split into two components, namely resistive and reactive components, according to conductivity and magnetic permeability of the measured object. Signals caused by ferrite are primarily reactive, while signals from stainless steel are primarily resistive. Products, which are conductive typically cause signals with a strong resistive component. Distinguishing between the phases of the signal components of different origin by means of a phase detector allows obtaining information about the product and the contaminants. Said signal components or phase and amplitude change depend on the frequency of the applied drive signal, which is selected such that the signal components of the metal contaminants will be out of phase with the signal components of the observed product signal.

Issued U.S. Pat. No. 8,473,235 discloses a metal detector with a drive circuit that is connected to a drive coil and that comprises a plurality of switches driven by a drive controller, which alternately connect the drive coil across a potential difference to cause the drive coil to be driven at a predetermined operating frequency. The drive controller can be programmed to operate the plurality of switches to obtain any single operating frequency, which may be selectable in the range of 40 to 900 KHz in 1 Hz increments. However, driving the coil system by a square wave (or a trapezoidal wave due to the inductance of the coil) generates a large number of relatively high energy harmonics compared with the conventional sinusoidal signal generated by a tuned circuit. In order to avoid a negative impact of these harmonics, the apparatus comprises a detection circuit for deriving a signal from the coil system wherein the detection circuit comprises a phase sensitive detector coupled to a low pass filter that rejects said disturbing harmonics, which are generally regarded as most undesirable.

While one operating frequency may be suitable for one specific metal contaminant, the same frequency may not provide the desired results for other metal contaminants. Simultaneously using two or more transmitter frequencies selected according to product and potential contaminants allows obtaining more accurate information about two or more different metal contaminants without switching the operating frequency.

U.S. Pat. No. 8,159,225 discloses a multi-frequency metal detector with a multi-frequency transmitter and a method for generating a multi-frequency drive signal by generating at least two rectangular wave signals, each having a different fundamental frequency; mixing the selected rectangular wave signals to produce a switching signal containing different frequency components of relatively high magnitude, at frequencies corresponding to the convolution of the fundamental frequencies of the two selected rectangular wave signals. In addition to desired frequency components again other frequency components are present, which need to be removed or suppressed.

Another patent, U.S. Pat. No. 8,159,225 further discloses that the digital drive switching signal is applied to a full-bridge switching power stage connected to the drive coil of the metal detector. The full-bridge switching power stage consists of two half-bridges, each comprising two half-bridge switches, one half-bridge driven with the digital switching signal and the other half-bridge driven with the inverted digital switching signal. The current in the half-bridge switches of the full-bridge switching power stage corresponds to the current flowing in the drive coil. Hence, for high currents in the drive coil half-bridge switches, are required that are capable of delivering this high coil current. The multi-frequency transmitter must therefore be dimensioned and built accordingly with considerable costs.

SUMMARY

The present invention is therefore based on the object of providing an improved method for operating a multi-frequency metal detector and to an improved multi-frequency metal detector operating according to this method.

The inventive method and multi-frequency metal detector shall advantageously allow producing a multi-frequency drive signal with at least two different frequency components. Filtering circuitry shall be avoided or at least reduced.

Further, the frequencies of the multi-frequency drive signals shall preferably be selectable as required so that the metal detector can flexibly be used for a wide range of products and potential contaminants.

The metal detector shall be equipped with an improved multi-frequency transmitter that has improved efficiency, is constructively simple, can be built at reduced cost and allows maximizing the coil current delivered to the drive coil.

The inventive method and metal detector shall allow producing high drive currents in the drive coil, while currents in the transmitter unit remain comparably low so that the transmitter circuitry can be dimensioned accordingly, e.g. with reduced power performance and cost.

In a first broad aspect of the invention there is provided a method for operating a metal detector, which comprises a drive coil designed for producing an electromagnetic field in a product, and at least one detection coil arranged for detecting fluctuations in the magnetic field caused by metallic particles present in the product, and a multi-frequency transmitter unit comprising a converter with a plurality of drive switches that are driven by a drive controller according to operating instructions such, that the drive switches alternately conduct a drive current through the drive coil so that the generated electromagnetic field exhibits two or more different frequency components.

The electromagnetic field with the two or more different frequency components is reached by the steps of:

determining a waveform of the drive current for the at least two different frequency components;

determining at least one pulse-sequence signal (below called PXM signal) corresponding to the defined waveform of the drive current;

according to the operating instructions provided selecting the at least one determined PXM-signal which is determined online or stored in a memory module; and generating and applying the determined PXM signal to control the drive switches of the transmitter unit, thereby generating the drive current with the defined waveform.

The at least one PXM-signal, preferably a pulse-width modulated or pulse-density modulated signal, can be determined and then stored in memory for later use. However, preferably the PXM-signal is determined and generated online, so that the metal detector can be tuned online to products and contaminants or can be adapted online to changing products and contaminants. The user may therefore adjust the metal detector according to his personal requirements.

Sarbari Das and Manish Bharat, Implementation of IGBT series resonant inverters using pulse-density modulation, International Journal of Industrial Electronics and Electrical Engineering, Volume-3, Issue-2, February 2015, describe that pulse-density modulation is a form of modulation used to represent an analogue signal with digital data. In PDM, instead of specific amplitude values, the relative density of the pulses corresponds to the amplitude of the analogue signal.

Pulse-width modulation techniques are described in M. J. Grimble, M. A. Johnson, Jian Sun, Advances in industrial Control, Springer-Verlag London Limited 2012, Chapter 2. In principle, a PWM signal can be produced by comparing a reference signal with a carrier signal, e.g. a sawtooth carrier, an inverted sawtooth carrier or a triangle carrier. The preferably mathematically determined waveform of the drive current can therefore be used as the reference signal which is compared with a carrier signal, e.g. a sawtooth or triangle carrier.

The drive switches of the converter, preferably power-FET units, may be arranged for example as a bridge circuit or the half bridge circuit. In a first embodiment the drive switches are arranged as a full wave bridge or H-bridge comprising a first and a second branch that are connected on one side to a first voltage potential, e.g. a drive voltage, and on the other side to a second voltage potential, e.g. ground potential, and that comprise each a first or second centre tap, respectively, connected to a first or second end of the drive coil acting as a load. A first pair of the drive switches is arranged in the first branch and connected to one another at the first centre tap and a second pair of the drive switches is arranged in the second branch and connected to one another at the second centre tap. The drive switches are then controlled such that the first and second end of the drive coil are alternately connected to the first and the second voltage potential. I.e., the upper part of the first branch and the lower part of the second branch on the one hand and the lower part of the first branch and the upper part of the second branch on the other hand are activated alternatively thus leading an alternating current through the drive coil with the predetermined shape or waveform.

In another embodiment a first and a second drive switch form a half-bridge circuit that is connected on one side to a first voltage potential, e.g. a first drive voltage, and on the other side to a second voltage potential, e.g. a second drive voltage. The first and a second drive switch are connected at a centre tap of the half-bridge circuit and are controllable such that the first end of the drive coil, which is connected to the centre tap, is alternately connectable to the first voltage potential and to the second voltage potential.

The drive switches are actuated by means of the predetermined PXM-signal or by two or more PXM signals. In the event that only one PXM-signal is provided, then this PXM signal is applied to the drive switches directly or via inverters, so that the individual drive switches are actuated correctly. In the event that two PXM signals are provided, the drive circuitry, which preferably comprises amplifiers, can get simplified.

In a preferred embodiment the step of determining the shape or waveform of the drive current for two or more different frequency components comprises superposing current components individually relating to one of the at least two different frequency components. Such frequency components may be sinusoidal and may represent odd and/or even harmonics. Hence, the function of the drive current in the time domain can mathematically be determined, e.g. by a corresponding program module. The PXM-signals can be predetermined or can be determined, whenever the user selects new operating frequencies are frequency components.

The user of the metal detector can therefore determine which frequencies or frequency components would be suitable for detecting potential contaminants or metal particles. The signal functions or drive current for each frequency component is then determined by superposition of each frequency component in the time domain. The fundamental angular frequency, i.e. the first frequency component is $\omega$. In the formula below, the remaining angular frequencies are selected as the 3rd, 7th and 17th harmonics. The weights of the four angular frequency components have an inverse ratio in terms of the frequencies:

$$i(\omega t)=I \sin(\omega t)+I/3 \sin(3\omega t)+I/7 \sin(7\omega t)+I/17 \sin(17\omega t)$$

The user of the metal detector can preferably determine any number of waveforms of the drive current for different sets of two or more different frequency components. For different products and/or different potential contaminants the user may therefore select the waveform of the drive current with the suitable set of frequency components. I.e., the user can continuously optimise detection processes.

The PXM-signal corresponding to the preferably mathematically determined waveform of the drive current can be determined in various ways with a desired precision so that in the frequency domain only the desired frequency components appear. In the event that disturbing frequency components remain, such disturbing frequency components may be suppressed by a filter that is located before or after a phase detector, which receives a signal from the detection coils and a reference signal from the transmitter unit.

In a preferred embodiment the pulse sequence or PXM-signal is obtained by approximating a triangular or trapezoidal signal to the preferably mathematically determined waveform of the drive current such that the maxima and minima of the determined waveform of the drive current and the maxima and minima of the triangular or trapezoidal signal correspond to one another and/or coincide. The switching angles for falling and rising edges of the PXM-signal are then sequentially defined at the maxima and minima of the triangular or trapezoidal signal. The approximation of the triangular or trapezoidal signal is preferably made in such a way that the minima or the maxima of the determined waveform of the drive current and the maxima or minima of the triangular or trapezoidal signal overlap at identical positions. The fundamental conception of this morphological approximation is that if two signals have similar time-domain waveforms, they shall share similar amplitude spectrum. Alternatively one of the PWM or PDM methods can be used to derive the pulse sequence signal.

In a further preferred embodiment the described process for preferably mathematically determining the waveform of the drive current for the selected frequency components and for determining the corresponding PXM-signal is automatically executed by a processor and a corresponding program provided in the metal detector. The user of the metal detector can therefore freely select two or more suitable frequency components, whereafter said processor and program determine the PXM-signal or the related switching angles of the PXM-signal. Alternatively, switching angles for sets of standard operation frequencies can be firmly programmed and stored in the drive controller and selected according to the executed industrial or non-industrial processes.

The waveform of the drive current with the embossed frequency components is preferably determined for one cycle duration of the frequency component with the lowest frequency present in the waveform of the drive current. This time segment of the drive current contains all information of the continuous drive current. The actual drive current can therefore be generated by sequentially repeating the preferably mathematically determined waveform of the drive current for the period of the lowest frequency contained in the drive current by the repeated application of the corresponding sequence of the PXM-signal.

The drive current can directly be supplied to the drive coil so that's the drive current provided by the converter and the coil current delivered to the drive coil are identical. In a preferred embodiment however, the drive current it is supplied via an admittance unit to the drive coil, which admittance unit together with the drive coil forms resonant circuits that are active in the two or more different frequency components of the drive current. By tuning the resonant circuits of the admittance unit and the drive coil to the frequency components of the drive current or vice versa the current appearing in the drive coil will be significantly larger than the drive current flowing through the drive switches or power FETs. The multi-frequency transmitter unit with the power FETs can therefore be dimensioned for smaller currents than actually required in the drive coil. Furthermore when the output impedance of the converter is high by properly tuning the resonant circuits, the level of the frequency components desired for detecting contaminants in the products is increased, while other unwanted frequency components are not increased or even reduced, thus improving the signal-to-noise ratio of the obtained signals and the sensitivity of the metal detector.

In a preferred embodiment the admittance unit comprises at least a first branch with a first capacitor and a first inductor that together with drive coil form a first resonant circuit and a second branch with a second capacitor and a second inductor that together with drive coil form a second resonant circuit. Preferably, the branches and/or the individual capacitors and inductors can be connected individually or in groups to the drive coil in order to establish the individual resonant circuits, which correspond to the frequency components embossed in the drive current.

Most preferably, one of the stored PXM-signals with a specific set of frequency components and corresponding resonant circuits in the admittance unit are jointly selectable by the user of the metal detector. In this way the metal detector can instantaneously be optimised for any combination of products and contaminations.

The implementation of the method and devices for creating the multi-frequency drive current on the one hand and the use of the admittance unit on the other hand are particularly advantageous when implemented in combination but also provide significant improvements, when implemented independently from one another. I.e., the inventive admittance unit which forms together with the drive coil two or more individually tuned resonant circuits can also advantageously be applied in metal detectors, in which the multi-frequency drive current these obtained according to another method.

BRIEF DESCRIPTION OF DRAWINGS

Detailed aspects and examples of the invention are described below with reference to the drawings, wherein.

DESCRIPTION OF EMBODIMENTS

Figure 1A:
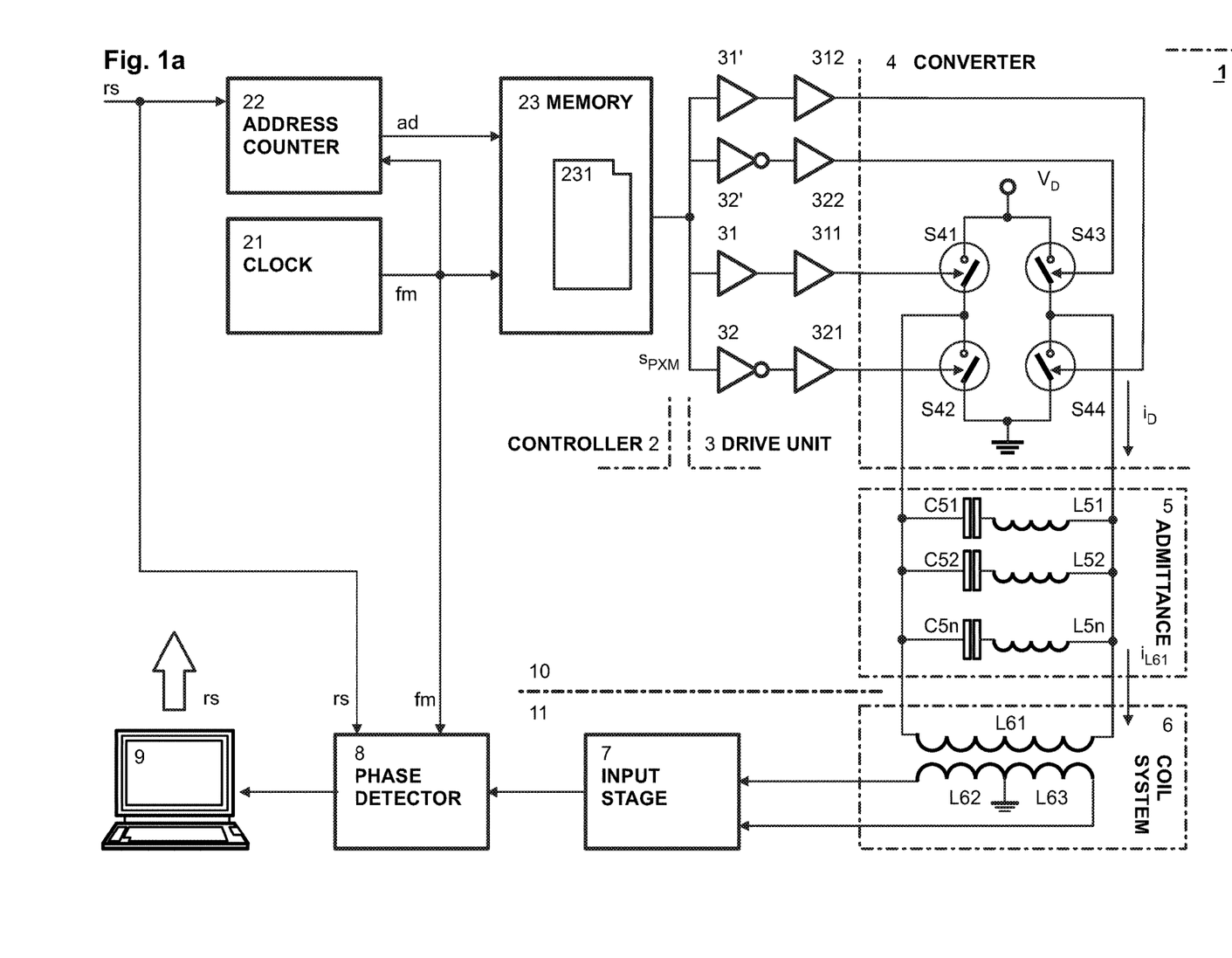
FIG. 1a shows an inventive metal detector 1, which comprises a converter 4 with four drive switches S41, S42, S43, S44 that for a bridge and that are controlled by means of a selectable pulse-width or pulse-density modulated signal $s_{PXM}$, below called PXM-signal, provided by a drive controller 2 and that provide a drive current $i_D$ via an admittance unit 5 to a drive coil L61.

FIG. 1*a* shows a first embodiment of an inventive metal detector 1 that comprises a transmitter unit 10 and a receiver unit 11 and a balanced coil system 6 with a drive coil L61 connected to the output of the transmitter unit 10 and two detection coils L62 and L63 connected on one end to ground potential and with the other end to an input stage 7 of the receiver unit 11. In the input stage 7 the input signal is typically amplified and filtered and then forwarded to a phase detector 8. The phase detector 8 allows distinguishing between the phases of the signal components of different origin and obtaining information about the observed product and contaminants, if present. A typical phase detector, e.g. a frequency mixer or analogue multiplier circuit, generates two independent voltage signals which represent the in-phase and quadrature component provided by the input stage 7, and a reference signal fm provided by the transmitter unit 10. The output signal of the phase detector 8 is further processed in a control unit 9, which is preferably equipped with a signal processor, input output devices, a keyboard and a display. By means of the control unit 9 the user can control the operation of the metal detector 1. In particular the user can select operating conditions of the metal detector, particularly the applied drive currents and operating frequencies as described below. The receiver unit 11 may include further features as generally known from conventional metal detectors.

The transmitter unit 10 is a multi-frequency transmitter that is designed to provide a drive signal with a plurality of frequencies, e.g. two to eight frequencies, providing good sensitivity in a broad range of products and contaminants. The transmitter unit 10 comprises a drive controller 2, a drive unit 3, a converter 4 and preferably an admittance unit 5, which forwards a drive current $i_D$ provided by the converter 4 to the drive coil L61.

In this embodiment of the invention the drive controller 2 comprises a memory unit 23 with one memory module 231 in which data that relates to the state of the drive switches S41, S42, S43, S44 for every clock cycle for a long period of the lowest operating frequency, e.g. switching angles $\alpha 1$, $\alpha 2$, . . . of a pulse-width modulated signal or PXM-signal $s_{PXM}$, are stored at related addresses. Determination of a pulse-width modulated signal $s_{PXM}$ is discussed below with reference to FIG. 4. As outlined above, any pulse sequence PXM-signal $s_{PXM}$ that corresponds to the drive current when applied to the drive switches S41, S42, S43, S44 can be used. Preferably, a pulse-width modulated signals or sequence or a pulse-density modulated signal or sequence is applied. Hence, instead of using the acronym PWM for pulse-width modulated signals and PDM for pulse-density modulated signals, the acronym PXM is used, which stands for a modulated pulse sequence that corresponds to the drive current.

After the system has been reset by reset signal rs issued by the control unit 9, the memory module 231 is sequentially addressed by the address counter 22 with address signal ad such that the data of the PXM-signal $s_{PXM}$ is sequentially read out of the memory module 231 and applied via the drive unit 3 to the drive switches S41, S42, S43, S44. The PXM-signal $s_{PXM}$ is routed via drive elements 31 and 311 to the input of drive switch S41, via drive elements 32 and 321 to the input of drive switch S42, via drive elements 31' and 312 to the input of drive switch S44 and via drive elements 32' and 322 to the input of drive switch S43. The drive elements 32 and 32' are inverters which ensure that the drive switches S42 and S43 always open, when the drive switches S41 and S44 are closed and that the drive switches S42 and S43 always closed, when the drive switches S41 and S44 are open. In this way an alternating current is flowing through the drive coil L61 while a short-circuit is avoided. For the sake of simplicity of the drawing, the elements 31, 31' and 32, 32' have been duplicated. The output of element 31 could however be connected to the inputs of elements 311 and 312 and the output of element 32 could be connected to the inputs of elements 321 and 322 without requiring the elements 31' and 32'.

In order to obtain phase coherent operation of the metal detector a clock unit 21 is provided, which delivers reference signals fm to the address counter 22, the memory unit 23 and the phase detector 8.

Since data of the PXM-signal $s_{PXM}$ are preferably stored for only one period of the lowest operating frequency, data are repetitively read out from the memory module 231. The segment of the drive current $i_D$ shown in FIG. 4 it is therefore sequentially and repetitively produced until the user terminates operation or changes settings. The address counter 22 therefore counts from the lowest address number to the highest address number and restarts at the lowest address number.

The drive switches S41, S42; S43, S44 are arranged in a full wave bridge circuit or H-bridge comprising a first branch and a second branch that are connected on one side to a drive voltage $V_D$ and on the other side to ground potential. The first branch comprises a first centre tap connected to the first end of the drive coil L61. The second branch comprises a second centre tap connected to the second end of the drive coil L61. A first pair of the drive switches S41, S42 is arranged in the first branch of the bridge and connected to one another at the first centre tap. A second pair of the drive switches S43, S44 is arranged in the second branch and connected to one another at the second centre tap. As described above, by applying the PXM-signal $s_{PXM}$ to the drive switches S41, S42; S43, S44 the first and second end of the drive coil L61 are alternately connected to the drive voltage $V_D$ and ground potential, respectively.

The converter 4 converts the PXM-signal $s_{PXM}$ into a drive current $i_D$ which comprises desired frequency components, preferably harmonics of the lowest frequency, for example according to the formula, which has been used to determine the PXM-signal $s_{PXM}$:

$$i(\omega t)=I \sin(\omega t)+I/3 \sin(3\omega t)+I/7 \sin(7\omega t)+I/17 \sin(17\omega t).$$

As described below with reference to FIG. 4 the PXM-signal $s_{PXM}$ this preferably created according to such a formula so that after conversion in the converter 4 a drive current $i_D$ e.g. with the four frequency components of this formula or a close approximation thereof is generated. Other harmonics are preferably avoided or suppressed. In order to increase sensitivity the desired harmonics are expanded. Further, it would be desirable to generate high coil currents $i_{L61}$ with comparably small drive currents $i_D$. These objects are reached by guiding the drive current $i_D$ via an admittance unit 5 to the drive coil L61.

In the embodiment shown the admittance unit 5 comprises several branches, each provided with a capacitor C51; C52; C5n and an inductor L51; L52; L5n. The number n of branches corresponds to the number of frequency components present in the drive current $i_D$. Each of the branches C51, L51; C52, L52; C5n, L5n forms together with the drive coil L61 a resonant circuit tuned to the corresponding frequency components $\omega$, $3\omega$, $7\omega$, $17\omega$ of the drive current $i_D$. The coil currents $i_{L61}$ in the drive coil L61 at resonance are significantly larger than the drive current $i_D$. Hence, on the one hand, the drive current $i_D$ flowing in the drive switches S41, S42; S43, S44 can be reduced, while high coil currents $i_{L61}$ are reached. The converter 4 can therefore be dimensioned for lower currents and can be built at reduced costs.

The metal detector of FIG. 1a is tuned to a specific set of frequencies of the PXM-signal $s_{PXM}$ stored in the drive controller 2. The admittance unit 5 with its branches C51, L51; C52, L52; C5n, L5n is fixed to resonate together with the drive coil L61 at this set of frequency components $\omega$, $3\omega$, $7\omega$, $17\omega$.

Figure 1B:
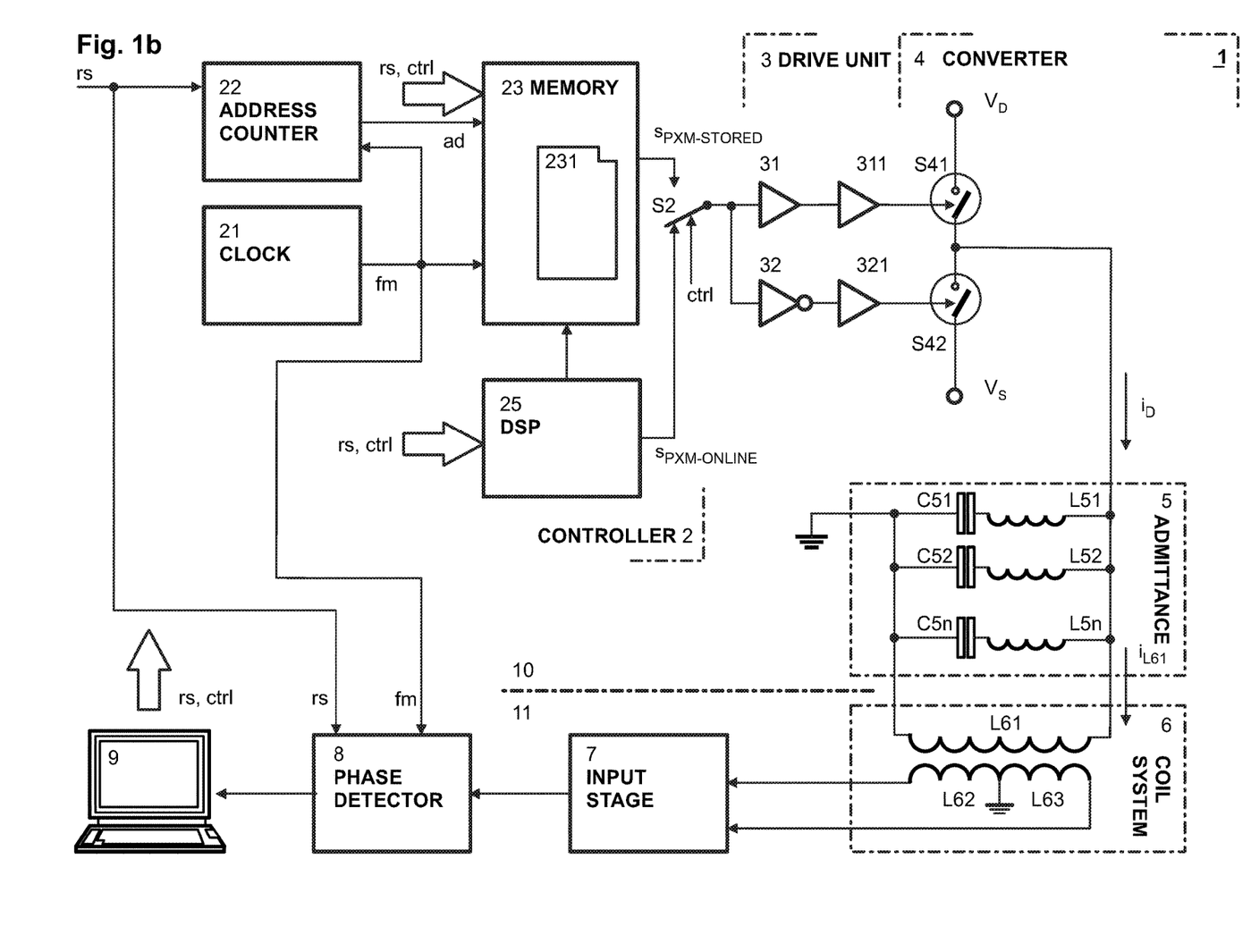
FIG. 1*b* shows the metal detector 1 of FIG. 1*a*, which comprises a converter 4 with two drive switches S41, S42 that form a half-bridge and that are controlled by means of a selectable PXM-signal $s_{PXM}$ provided by the drive controller 2 and that provide a drive current $i_D$ via the admittance unit 5 to the drive coil L61.

FIG. 1b shows the metal detector 1 of FIG. 1a in an embodiment with a converter 4 with two drive switches S41, S42 that form a half-bridge and that are controlled by means of a selectable PXM-signal $s_{PXM}$, such as a pulse-width or pulse-density modulated signal, provided by the drive controller 2. The drive switches S41, S42 provide a drive current $i_D$ via the admittance unit 5 to the drive coil L61. The drive switches S41, S42 form a half-bridge circuit that is connected on one side to a first voltage potential $V_D$, e.g. the first drive voltage, and on the other side to a second voltage potential $V_S$, e.g. a second drive voltage. The drive switches S41, S42 are connected at a centre tap of the half-bridge circuit and are controlled such that the first end of the drive coil L61, which is connected to the centre tap, is alternately connected to the first voltage potential $V_D$ and to the second voltage potential $V_S$.

Further, as described above, in preferred embodiments, the PXM-signal $s_{PXM}$ can be generated online and forwarded to the converter 4. In FIG. 1b a selector switch S2 is provided, which is controlled by the control unit 9 by means of a control signal ctrl. The selector switch S2 can be set to receive a PXM-signal $s_{PXM\text{-}STORED}$ provided by the memory module 23 or to receive a PXM-signal $s_{PXM\text{-}ONLINE}$ provided online by a processor unit 25, e.g. a digital signal processer DSP, which is controlled by the control unit 9 by means of a control signal ctrl. In the processor unit 25 a program is implemented, with which suitable pulse-width modulated signals and/or pulse-density modulated signals can be generated. The processor unit 25, which, together with the other circuitry, is preferably integrated into the control unit 9, may also generate PXM-signals that are stored in the memory unit 23 for later use.

In all embodiments discussed, the PXM-signal $s_{PXM}$ may be selected from the memory unit 23 and/or from the processor unit 25 with any configuration of drive switches S41, . . . , S44 present and with any configuration of the admittance unit 5, if present. Hence, the features of the individual embodiments can freely be combined. In particular, processor unit 25 can most advantageously be used to generate a PXM-signal $s_{PXM}$ online, with any set of operating frequencies. At the same time the admittance unit 5 may automatically be tuned to the same set of operating frequencies. The processor unit 25 may replace the memory unit 23 in all disclosed circuits or may be used as an alternative source for the PXM-signal $s_{PXM}$.

Figure 2:
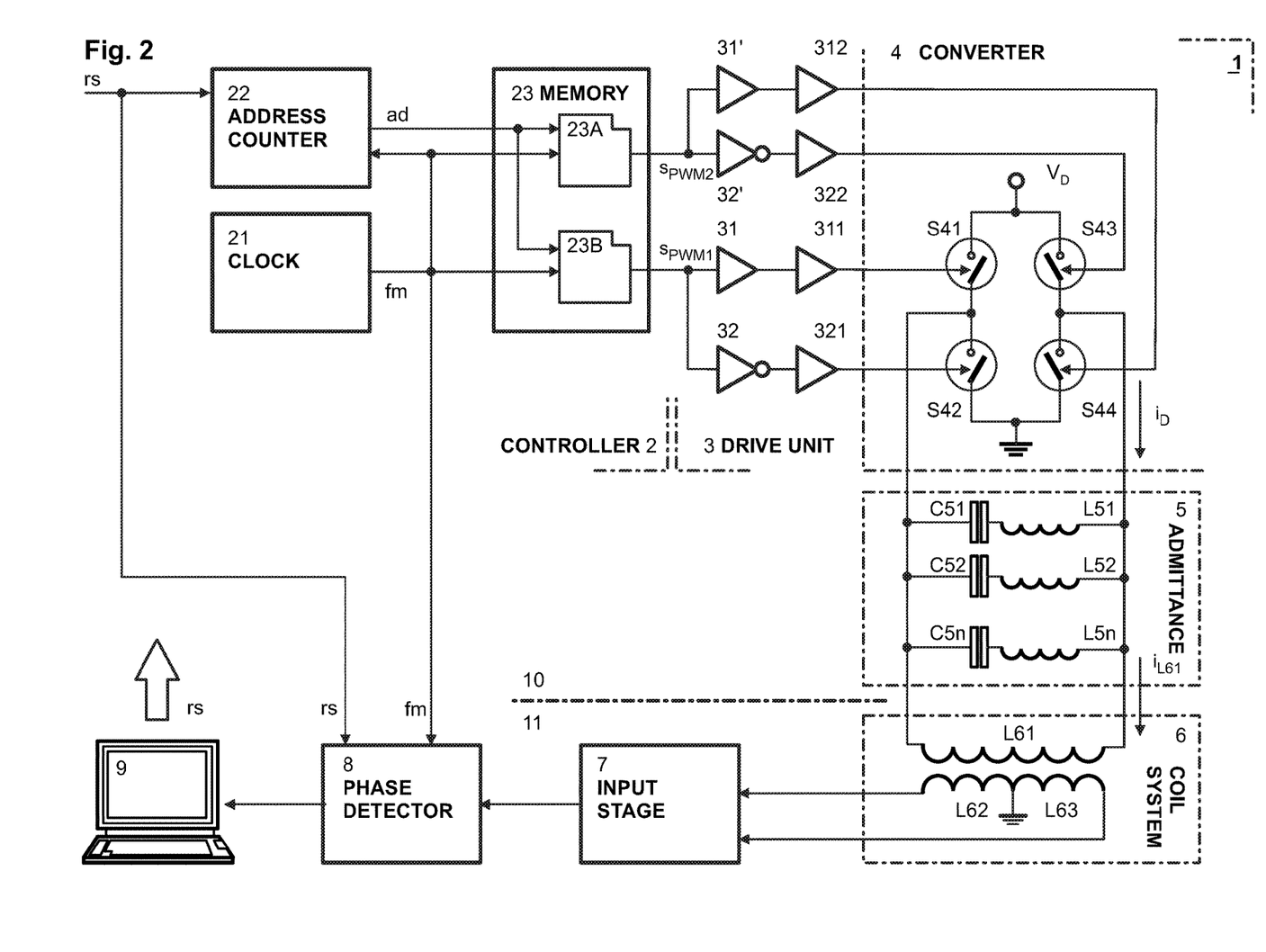
FIG. 2 shows the metal detector 1 of FIG. 1*a* equipped with a drive controller 2, which provides a first PXM-signal $s_{PXM1}$ used for controlling drive switches S41, S42 and a corresponding second PXM-signal $s_{PXM2}$ used for controlling drive switches S43, S44.

FIG. 2 shows the metal detector 1 of FIG. 1a equipped with a drive controller 2, which provides a first PXM-signal $s_{PXM1}$ used for controlling drive switches S41, S42 and a corresponding second PXM-signal $s_{PXM2}$ used for controlling drive switches S43, S44. The first PXM-signal $s_{PXM1}$ is stored in memory module 23A and the second PXM-signal $s_{PXM2}$ stored in memory module 23B preferably at corresponding addresses. The address counter 22 can therefore synchronously address both memory modules 23A and 23B in order to simultaneously read out the first PXM-signal $s_{PXM1}$ and the second PXM-signal $s_{PXM2}$. The memory modules 23A and 23B may store PXM-signals $s_{PXM1}$ and $s_{PXM2}$ that are inverted to one another. Having two PXM-signals makes it possible for the converter 4 to have 0 volts differential on its outputs when both PXM-signals are at ground potential or both are at the potential of the drive voltage $V_D$. This allows the generation of trapezoidal waves and better current control.

Figure 3:
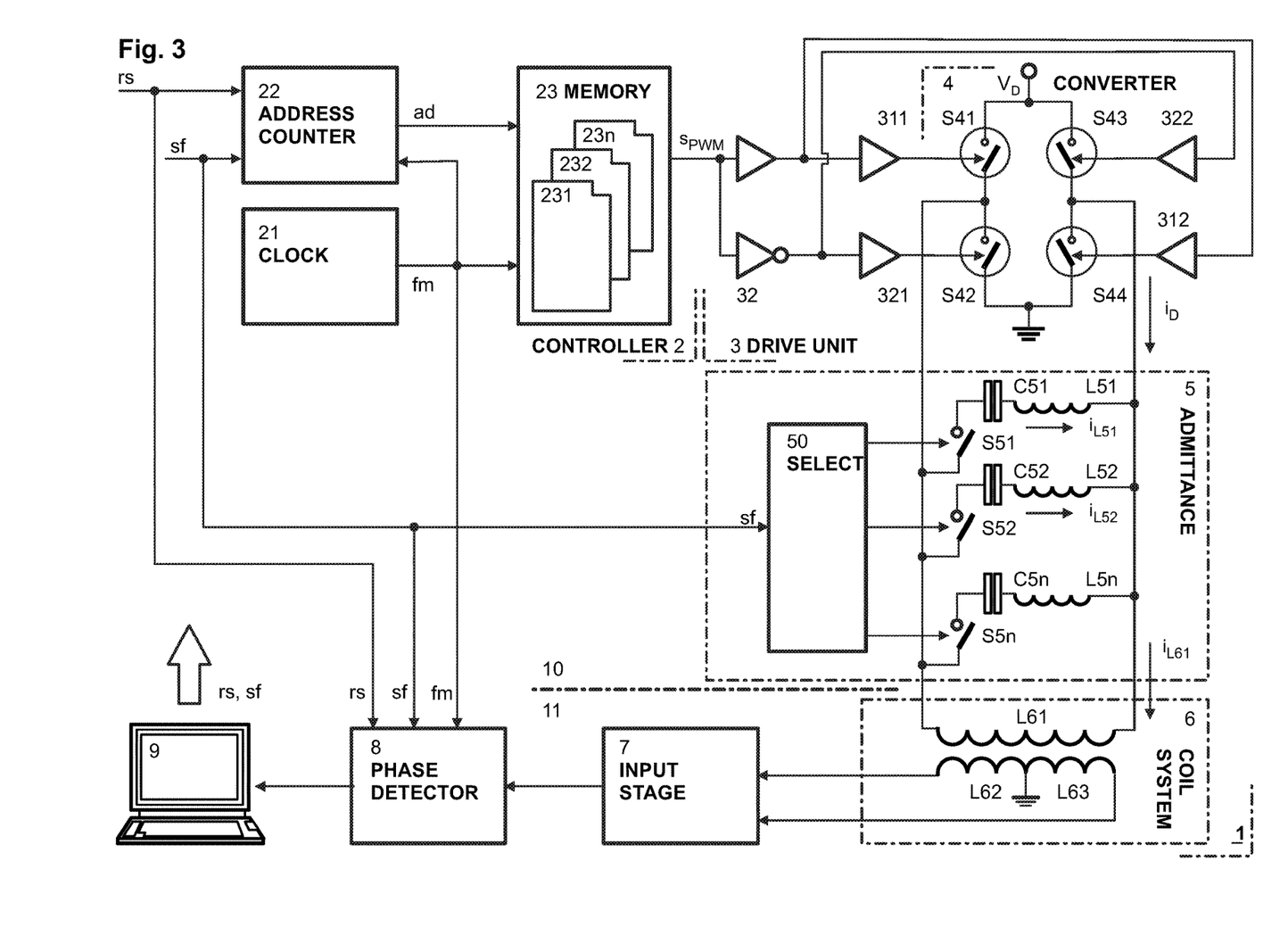
FIG. 3 shows the metal detector 1 of FIG. 1*a* equipped with a drive controller 2 that allows selecting one of a plurality of stored PXM-signals $s_{PXM}$, each provided with a specific set of frequency components, and with an admittance unit 5 that allows selectively connecting at least one of a plurality of branches, which comprise each at least one capacitor C51; C52; C5*n* and at least one inductor L51; L52; L5*n*, to the drive coil L61 in order to create resonant circuits tuned to the frequency components of a selected PXM-signal $s_{PXM}$.

FIG. 3 shows the metal detector 1 of FIG. 1a equipped with a drive controller 2 that allows selecting one of a plurality of stored PXM-signals $s_{PXM}$, each provided with a specific set of frequency components, and with an admittance unit 5 that allows selectively connecting at least one of a plurality of branches, which preferably comprise each at least one capacitor C51; C52; C5n and at least one inductor L51; L52; L5n, to the drive coil L61 in order to create resonant circuits tuned to the frequency components of a selected PXM-signal $s_{PXM}$. Data of each PXM-signal $s_{PXM}$ are stored individually in a corresponding memory module 231; 232; 23n. The branches of the admittance unit 5 can individually be activated by means of switches S51, S52, S5n which are actuated by means of a selector 50.

In order to select a specific PXM-signal $s_{PXM}$ with a desired set of operating frequencies $\omega1$, $\omega2$, $\omega3$, $\omega4$ and to select the corresponding resonant circuits or branches C51, L51; C52, L52; C5n, L5n in the admittance unit 5, the control unit 9 provides a frequency select signal sf for example to the address counter 22, optionally to the memory unit 23, and to the selector 50. The address counter 22 will then address the selected memory module 231, 232 or 23n and the selector 50 the corresponding switches S51, S52, S5n.

The metal detector 1 of FIG. 3 can therefore selectively be tuned to any set of frequencies selected for a specific product and potential contaminants. Resonance circuits can be tuned by adding capacitors and inductors e.g. by means of switches, such as electronic switches. Values of these items may also be changed electronically.

Figure 4:
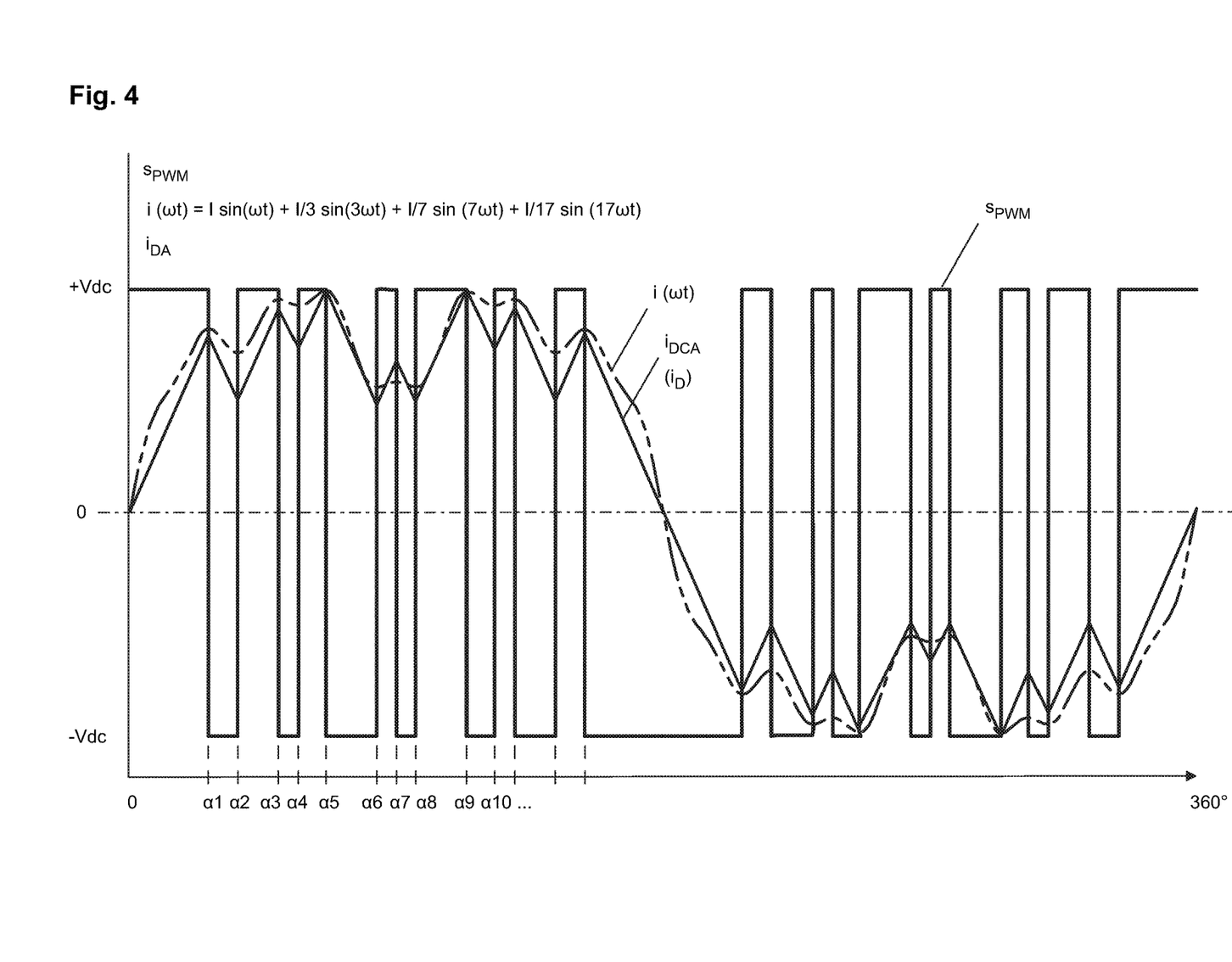
FIG. 4 shows a mathematically determined waveform of the drive current $i_D$ or $i(\omega t)$ that includes four frequency components $\omega$, $3\omega$, $7\omega$ and $17\omega$ as well as the related PXM-signal $s_{PXM}$ determined by approximation of a triangular signal $i_{DA}$ to the determined waveform of the drive current $i(\omega t)$.

FIG. 4 shows a mathematically determined waveform of the drive current $i(\omega t)$:

$$i(\omega t) = I \sin(\omega t) + I/3 \sin(3\omega t) + I/7 \sin(7\omega t) + I/17 \sin(17\omega t)$$

that includes four frequency components $\omega$, $3\omega$, $7\omega$ and $17\omega$ but no disturbances. Further shown is a related PXM-signal $s_{PXM}$ that has been determined by approximation of a triangular signal $i_{DA}$ to the determined waveform of the mathematically determined drive current $i(\omega t)$. Since the drive current $i_D$ and the coil current $i_{L61}$ have only two possible gradients for FIGS. 1 and 3 and three possible gradients including zero for FIG. 2, the mathematically determined waveform of the drive current $i(\omega t)$ is resembled or approximated by using triangular or trapezoidal segments. The mathematically determined waveform of the drive current $i(\omega t)$ is shown in a dashed line. The waveform of the approximated triangular signal $i_{DA}$ closely follows the waveform of the mathematically determined drive current $i(\omega t)$. In the first half of the period or the positive half wave, the maxima of the triangular signal $i_{DA}$ are set to the maxima of the mathematically determined drive current $i(\omega t)$. In the second half of the period or the negative half wave, the minima of the triangular signal $i_{DA}$ are set to the minima of the mathematically determined drive current $i(\omega t)$. The approximated triangular signal $i_{DA}$ is not the actual drive current $i_D$ but ideally its mirror image. The approximated triangular signal $i_{DA}$ is converted to a PXM-signal $s_{PXM}$, which is then converted in the converter 4 to the actual drive current $i_D$, the mirror image of the approximated triangular signal $i_{DA}$. In FIG. 4 with brackets it is indicated that the actual drive current $i_D$ at least approximately also corresponds to the approximated triangular signal $i_{DA}$. If however, if higher frequencies are suppressed, then the virtual drive current $i_D$ will rather resemble the mathematically determined drive current $i(\omega t)$.

Approximation by triangular or trapezoidal segments has the advantage that unwanted signals occur remote from the selected frequency components $\omega 1$, $\omega 2$, $\omega 3$, $\omega 4$ and therefore have no significant impact on measurement. Further the typical location of such disturbing signals in the Fourier spectrum is known, wherefore such disturbing signals can easily be suppressed in the input stage 7 of the receiver unit 11 by filter means selected accordingly. U.S. Pat. No. 8,473,235 mentioned above discloses a circuit with filter stages located subsequent to the phase detectors. In the present invention, filtering efforts are smaller. However any known filtering technique can also be applied to the signal delivered by the detection coils L62, L63 before or after demodulation, i.e. before and/or after the phase detector 8.

By means of the determined triangular signal $i_{DA}$ the switching angles $\alpha 1$, $\alpha 2$, ... of the PXM-signal $s_{PXM}$ can be determined, which is required to control the drive switches S41, S42, S43, S44 in the converter 4. These switching angles $\alpha 1$, $\alpha 2$, ... are positioned at the relative maxima and minima of the determined triangular signal $i_{DA}$. Thereby the falling edges of the PXM-signal $s_{PXM}$ are set to occur at the maxima of the determined triangular signal $i_{DA}$ and the rising edges of the PXM-signal $s_{PXM}$ are set to occur at the minima of the determined triangular signal $i_{DA}$. The obtained PXM-signal $s_{PXM}$ or PXM-signals $s_{PXM1}$, $s_{PXM2}$, ... is/are then stored in the memory unit 23, i.e. in one of the memory modules 231, 232, 23n; 23A, 23B.

FIG. 4 shows the mathematically determined waveform of the drive current $i(\omega t)$, the approximated triangular signal $i_{DA}$ and the determined PXM-signal $s_{PXM}$ for the length of one period of the lowest frequency $\omega$. Repetitively reading out the data of the PXM-signal $s_{PXM}$ from the related memory module 231, 232, 23n; 23A, 23B allows therefore to establish a continuous stream of the PXM-signal $s_{PXM}$.

Figure 5:
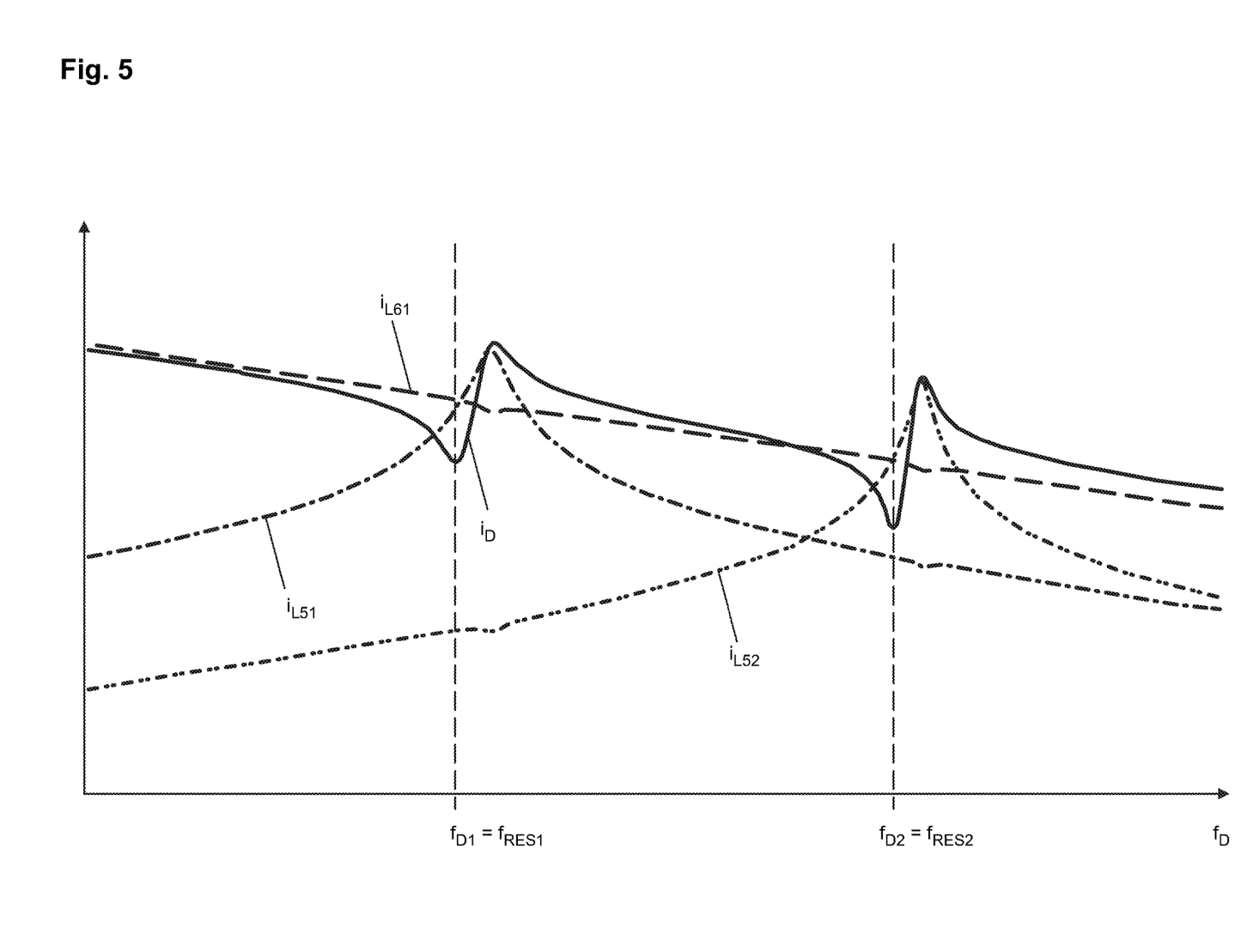
FIG. 5 shows the coil current $i_{L61}$ in the drive coil L61, the currents $i_{L51}$, $i_{L52}$ in the branches of the admittance unit 5 and the drive current $i_D$ delivered by the drive switches S41, S42, S43, S44 in the converter unit 4 for the complete frequency spectrum of the metal detectors of FIG. 1*a*, FIG. 1*b*, FIG. 2 and FIG. 3 indicating that the drive current $i_D$ is significantly lower than the coil current $i_{L61}$ if the frequency components $f_{D1}$, $f_{D2}$ of the drive current $i_D$ are set to the resonant frequencies $f_{RES1}$, $f_{RES2}$ of the admittance circuit 5.

FIG. 5 shows the coil current $i_{L61}$ in the drive coil L61, the currents $i_{L51}$, $i_{L52}$ in the branches of the admittance unit 5 (see FIG. 3) and the drive current $i_D$ delivered by the drive switches S41, S42, S43, S44 in the converter unit 4 for the complete frequency spectrum of the metal detectors of FIG. 1a, FIG. 1b, FIG. 2 and FIG. 3. While the gradient of the coil current $i_{L61}$ extends almost linear, the curve of the drive current $i_D$ shows a strong decay at each resonant frequency frequencies $f_{RES1}$, $f_{RES2}$ so that the drive current $i_D$ is well below the coil current $i_{L61}$ at these positions of the spectrum. Hence, with comparably small drive currents $i_D$ with drive frequencies $f_{D1}$, $f_{D2}$ set to the resonant frequencies $f_{RES1}$, $f_{RES2}$ of the admittance unit 5 and drive coil L61, or vice versa, large coil currents $i_{L61}$ can be reached. An explanation for this advantageous effect can be given with regard to the currents $i_{L51}$, $i_{L52}$ appearing in the branches of the admittance unit 5 which currents $i_{L51}$, $i_{L52}$, at the resonant frequencies $f_{RES1}$, $f_{RES2}$ of the admittance unit 5, are equivalent to the coil current $i_{L61}$ in the drive coil L61. The admittance unit 5 contains in its branches passive components, e.g. inductors L51; L52, L5n and capacitors C51, C52, C5n, which when in resonance together with the drive coil L61 cause the current to circulate between the drive coil L61 and the branches of the admittance unit 5. Advantageously, the power circulation at the predetermined drive frequencies $f_{D1}$, $f_{D2}$ set to the resonant frequencies $f_{RES1}$, $f_{RES2}$ is restricted within the loop formed by the admittance unit 5 and the drive coil L61 making the driving-point admittance to be zero on an ideal lossless system. Consequently, the drive currents $i_D$ flowing at the drive frequencies $f_{D1}$, $f_{D2}$ through the drive switches S41, S42, S43, S44, typically MOSFETs, will be much lower than the coil currents $i_{L61}$ flowing through the drive coil L61 and the branches of the admittance unit. Among other advantages, enables the extension of the spectrum towards lower frequencies and the possibility of driving a low impedance drive coil L61.

In the drawings, preferred embodiments of the admittance unit 5 are shown. However, any other circuitry that preferably selectively allows reaching resonant circuits operating at defined frequencies $f_{RES1}$, $f_{RES2}$ are of course also applicable.

What is claimed is:

1. A method for operating a metal detector which has a drive coil that produces an electromagnetic field in a product, at least one detection coil that is arranged to detect fluctuations in a magnetic field caused by the presence of metallic particles in the product, and a multi-frequency transmitter unit having a converter with a plurality of drive switches that are driven by a drive controller according to operating instructions, with the drive switches alternately conducting a drive current ($i_D$) through the drive coil so that the generated electromagnetic field exhibits two or more different frequency components ($f_{D1}$, $f_{D2}$); the method comprising the steps of:
- determining a waveform of the drive current ($i_D$) for the at least two different frequency components ($f_{D1}$, $f_{D2}$);
- determining at least one pulse modulated ("PXM") signal ($s_{PXM}$) that is a modulated pulse sequence which corresponds to the determined waveform of the drive current ($i_D$), the at least one PXM signal the at least one PXM signal being either a pulse-width modulated signal or a pulse-density modulated signal; and
- controlling the drive switches by generating and applying the at least one determined PXM-signal ($s_{PXM}$) to the drive switches, wherein the at least one determined PXM-signal ($s_{PXM}$) is determined online or is stored in at least one module of a memory according to the operating instructions provided.

2. The method of claim 1, wherein the step of determining the waveform of the drive current ($i_D$) comprises the step of:
- superposing current components relating to the at least two different frequency components ($t_{D1}$, $f_{D2}$), including sinusoidal frequency components ($t_{D1}$, $f_{D2}$) that are odd and/or even harmonics.

3. The method of claim 2, further comprising the step of:
- determining the waveform of the drive current ($i_D$) at least for a cycle duration of a frequency component ($f_{D1}$) with a lowest frequency present in the drive current ($i_D$) and generating the drive current ($i_D$) by sequentially repeating the determined waveform of the drive current ($i_D$).

4. The method of claim 1, wherein:
- the step of determining the PXM-signal ($s_{PXM}$) is achieved by approximating a triangular or trapezoidal signal to the determined waveform of the drive current ($i_D$) such that the maxima and minima of the determined waveform of the drive current ($i_D$) and the maxima and minima of the triangular signal correspond to one another and/or coincide and defining switching angles ($\alpha 1$, $\alpha 2$, . . . ) sequentially for falling and rising edges of the PXM-signal ($s_{PXM}$) at the maxima and minima of the triangular or trapezoidal signal.

5. The method of claim 1, wherein the step of determining two or more PXM-signals ($s_{PXM}$) each with different sets of frequency components ($f_{D1}$; $f_{D2}$) and storing the two or more PXM-signals ($s_{PXM}$) in the at least one module of the memory, which are selectable for generating and applying one of the stored PXM-signals ($s_{PXM}$).

6. The method of claim 1, wherein the step of applying the at least one determined PXM-signal ($s_{PXM}$) to the drive switches is achieved by either:
- applying the PXM-signal to a first and a second drive switch of the plurality of drive switches, wherein the first and second drive switches form a half-bridge circuit that is connected on one side to a first voltage potential ($V_D$) and on the other side to a second voltage potential ($V_S$), which are connected at a centre tap of the half-bridge circuit, and which are controlled such that the first end of the drive coil, which is connected to the centre tap, is alternately connected to the first voltage potential ($V_D$) and to the second voltage potential ($V_S$), or
- applying the PXM-signal to the plurality of drive switches, which are arranged as a bridge circuit comprising a first and a second branch that are connected on one side to a first voltage potential ($V_D$) and on the other side to a second voltage potential such as ground potential and that comprise each a first or second centre tap, respectively, connected to a first and a second end of the drive coil with a first pair of the drive switches arranged in the first branch and connected to one another at the first centre tap and with a second pair of the drive switches arranged in the second branch and connected to one another at the second centre tap and which are controlled such that the first and second end of the drive coil are alternately connected to first voltage potential ($V_D$) and to the second voltage potential.

7. The method of claim 1, wherein the step of applying the at least one determined PXM-signal ($s_{PXM}$) to the drive switches is achieved by applying the PXM-signal ($s_{PXM}$) via a drive unit that comprises signal drive elements and/or inverters individually to control inputs of the drive switches.

8. The method of claim 1, further comprising the step of:
- guiding the drive current to the drive coil, directly or via an admittance unit to the drive coil, wherein the admittance unit together with the drive coil form a plurality of resonant circuits that are active in the two or more different frequency components ($f_{D1}$, $f_{D2}$), wherein each resonant circuit has coil current ($i_{L61}$) is larger than the drive current ($i_D$).

9. The method of claim 8, further comprising the steps of using at least a first branch with a first capacitor and a first inductor in the admittance unit that together with drive coil form a first resonant circuit of the plurality of resonant circuits and a second branch with a second capacitor and a second inductor in the admittance unit that together with drive coil form a second resonant circuit of the plurality of resonant circuits.

10. The method of claim 8, comprising the steps of:
- selecting the PXM-signal ($s_{PXM}$) with a set of frequency components ($f_{D1}$; $f_{D2}$); and
- activating the resonant circuits in the admittance unit that corresponds to the set of frequency components ($f_{D1}$; $f_{D2}$) of the selected PXM-signal ($s_{PXM}$).

11. The method of claim 1, further comprising the step of:
- determining the waveform of the drive current ($i_D$) at least for a cycle duration of a frequency component ($f_{D1}$) with a lowest frequency present in the drive current ($i_D$) and generating the drive current ($i_D d$) by sequentially repeating the determined waveform of the drive current ($i_D$).

12. A device for detecting metal in an object being inspected, comprising:
- a drive coil that produces an electromagnetic field in the object;
- at least one detection coil, arranged to detect fluctuations in the electromagnetic field, caused by metallic particles present in the object being inspected;
- a multi-frequency transmitter unit, comprising:
  - a drive controller, provided with a memory unit that stores a set of operating instructions and data for at least one pulse modulated ("PXM") signal ($s_{PXM}$) that corresponds to a pre-determined waveform; and
  - a converter having a plurality of drive switches driven by the drive controller according to the set of operating instructions such that the drive switches alternately conduct a drive current ($i_D$) through the drive coil to generate the electromagnetic field which exhibits at least two different frequency components ($f_{D1}$, $f_{D2}$) based on the pre-determined waveform.

13. The device of claim 12, wherein:
the set of operating instructions and data stored in the drive controller comprises instructions for doing at least one of the following:
applying the at least one PXM-signal ($s_{PXM}$) to a first and a second of the plurality of drive switches, which form a half-bridge circuit that is connected on one side to a first voltage potential ($V_D$) and on the other side to a second voltage potential ($V_S$), which are connected at a center tap of the half-bridge circuit, and which are controllable such that the first end of the drive coil, which is connected to the center tap, is alternately connectable to the first voltage potential ($V_D$) and to the second voltage potential ($V_S$), or
applying the at least one PXM signal ($s_{PXM}$) to the plurality of drive switches, which are configured as a bridge circuit comprising a first and a second branch, each branch being connected on one side to a first voltage potential ($V_D$) and on the other side to a second voltage potential such as ground potential, the bridge circuit also comprising a first or second center tap, respectively, connected to a first and a second end of the drive coil with a first pair of the drive switches arranged in the first branch and connected to one another at the first center tap and with a second pair of the drive switches arranged in the second branch and connected to one another at the second center tap and which are controllable such that the first and second end of the drive coil are alternately connectable to first voltage potential and to the second voltage potential.

14. The device of claim 12, further comprising:
an admittance unit that connects the converter to the drive coil, such that the admittance unit, together with the drive coil, forms at least two resonant circuits, each with a resonant frequency that is tuned at least approximately to one of the at least two different frequency components ($t_{D1}$, $f_{D2}$).

15. The device of claim 14, wherein the admittance unit comprises:
a first branch with a first capacitor and a first inductor in the admittance unit that together with drive coil forms a first of the resonant circuits, and
a second branch with a second capacitor and a second inductor in the admittance unit that together with drive coil forms a second of the resonant circuits.

16. The device of claim 14, further comprising:
means for activating and deactivating the resonant circuits, individually, in the admittance unit.

* * * * *

UNITED STATES PATENT AND TRADEMARK OFFICE
CERTIFICATE OF CORRECTION

PATENT NO. : 10,989,829 B2  
APPLICATION NO. : 16/264277  
DATED : April 27, 2021  
INVENTOR(S) : Tao et al.

Page 1 of 1

It is certified that error appears in the above-identified patent and that said Letters Patent is hereby corrected as shown below:

On the Title Page

Item (30), Foreign Application Priority Data, please delete "Feb. 1, 2018 (EP) .................. 18154719" and insert -- "Feb. 1, 2018 (EP) .................. 18154719.1" --.

In the Claims

In Column 13, Lines 11-12, Claim 1, please delete the second occurrence of "the at least one PXM signal".

In Column 13, Lines 16-17, Claim 1, please end Line 16 after the word "switches," and move "wherein the at least one determined" to start Line 17.

In Column 13, Line 23, Claim 2, please delete "($t_{D1}$, $f_{D2}$)" and insert -- ($f_{D1}$, $f_{D2}$) --.

In Column 13, Line 24, Claim 2, please delete "($t_{D1}$, $f_{D2}$)" and insert -- ($f_{D1}$, $f_{D2}$) --.

In Column 14, Line 44, Claim 11, please delete "($i_D$d)" and insert -- ($i_D$) --.

In Column 16, Line 13, Claim 14, please delete "($t_{D1}$, $f_{D2}$)" and insert -- ($f_{D1}$, $f_{D2}$) --.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*